United States Patent [19]
Carter et al.

[11] Patent Number: 5,914,199
[45] Date of Patent: Jun. 22, 1999

[54] PRESSURE EQUALIZED FUEL CELL STACK

[75] Inventors: Dennis L. Carter, Hudson; Dane W. Gregg, Hartville, both of Ohio

[73] Assignee: Lockheed Martin Tactical Defense Systems, Inc., Akron, Ohio

[21] Appl. No.: 08/905,763

[22] Filed: Aug. 4, 1997

[51] Int. Cl.[6] .................................................. H01M 8/18
[52] U.S. Cl. .......................... 429/25; 429/20; 429/26; 429/34; 429/39
[58] Field of Search .................... 429/20, 25, 26, 429/34, 39

[56] References Cited

U.S. PATENT DOCUMENTS

| | | | |
|---|---|---|---|
| 3,615,846 | 10/1971 | Plank | 429/25 |
| 4,098,959 | 7/1978 | Fanciullo | 429/25 |
| 4,098,960 | 7/1978 | Gagnon | 429/25 |
| 4,596,748 | 6/1986 | Katz et al. | 429/26 |
| 4,826,741 | 5/1989 | Aldhart et al. | 429/34 |
| 4,902,278 | 2/1990 | Maget et al. | 429/27 |
| 5,382,478 | 1/1995 | Chow et al. | 429/34 |
| 5,716,726 | 2/1998 | Cheiky | 429/25 |
| 5,853,909 | 12/1998 | Reiser | 429/25 |

*Primary Examiner*—Bruce F. Bell
*Attorney, Agent, or Firm*—Renner, Kenner, Greive, Bobak, Taylor & Weber

[57] ABSTRACT

A pressure equalized fuel cell stack includes a fuel cell stack for receiving an oxidizing agent, a coolant accumulator coupled to the fuel cell stack, an electrolyte accumulator coupled to the fuel cell stack and a device for equalizing the pressurized flow of coolant and electrolyte from the respective accumulators into the fuel cell stack depending upon the pressure exhibited by the oxidizing agent. The equalized pressure flow is obtained by an accumulator having a rigid housing for receiving an oxidizing agent and a flexible housing received within the rigid housing for receiving respective amounts of coolant and electrolyte wherein the flexible housing is coupled to the fuel cell such that any change in pressure within the rigid housing causes a corresponding change in pressure in the flexible housing. This construction allows for equalized amounts of oxidizing agent, coolant and electrolyte to be received by the fuel cell stack, thus maximizing the chemical reaction within the fuel cell to generate electricity and maintain long-life of the fuel cell.

12 Claims, 2 Drawing Sheets

PRESSURE EQUALIZED FUEL CELL STACK

TECHNICAL FIELD

The invention herein resides generally in the art of fuel cells. More particularly, the present invention relates to fuel cells employed in unmanned underwater vehicles. Specifically, the present invention relates to fuel cells which provide a simplified pressure equalization system for the coolant and the electrolyte received by the fuel cell.

BACKGROUND ART

In underwater vehicles, especially those that are unmanned, it is desirable to provide a self-contained power source to propel the vehicle. Some underwater vehicles, such as torpedoes, employ dry cell batteries to provide the necessary power. However, these batteries have a limited shelf life and if the vehicle is not used within a predetermined period of time, the vehicle is either scrapped or the batteries must be replaced.

It is also known to provide underwater vehicles with fuel cells which have an unlimited shelf life. Fuel cells are simple static devices that convert chemical energy in a fuel directly, isothermally, and continuously into electrical energy. Fuel and oxidant (typically oxygen or air) are fed to a fuel cell stack in which an electrochemical reaction takes place that generates electrical energy for powering the underwater vehicle. A coolant may also be supplied to the fuel cell stack to dissipate excess heat and maintain efficient operation of the fuel cell. Some fuel cells employ a moving anode configuration, wherein as the anode material is consumed, the anode is moved to maintain a predetermined distance between the anode and the cathode.

One important aspect of the operation of fuel cells with a moving anode is that the oxidizing agent, the electrolyte and the coolant must be maintained at substantially equivalent pressures within the fuel cell. Otherwise, unequalized pressure may cause structural failure of the cathode within the fuel cell and/or the entire cell structure. Accordingly, failure of the fuel cell causes failure of the underwater vehicle. One approach to overcoming the aforementioned problem has been to provide the fuel cell stack with active controls of the inlet pressure of the coolant and the electrolyte to match the inlet pressure of the oxidizing agent. It will be appreciated that such an active control system requires a plurality of sensors with sophisticated pump and valve control systems to maintain the desired pressure equalization. It will be appreciated that these pumps and valves add cost to the underwater vehicle and are prone to failure in undersea conditions. Additionally, these additional components increase the weight of the underwater vehicle and reduce its performance.

Based upon the foregoing, it is evident that there is a need in the art for a simplified pressure equalization scheme for fuel cell stacks used in underwater vehicles.

DISCLOSURE OF INVENTION

In light of the foregoing, it is a first aspect of the present invention to provide a pressure equalized fuel cell stack.

Another aspect of the present invention is to provide a light, yet efficient way of controlling inlet pressure for an oxidizing gas, a coolant and an electrolyte received by the fuel cell stack.

Still a further aspect of the present invention is to provide a coolant accumulator and an electrolyte accumulator coupled to their respective supply of coolant and electrolyte and to respective inlets of the fuel cell stack.

An additional aspect of the present invention, as set forth above, is to provide each of the accumulators with a rigid outer housing which receives therein a flexible bladder.

Yet an additional aspect of the present invention, as set forth above, is to couple the supply of the oxidizing agent to each rigid housing so that it exerts an equalized pressure force on each flexible bladder, which in turn creates an equalized pressure force upon the coolant and the electrolyte received within the flexible bladder and the fuel cell stack.

A further aspect of the present invention, as set forth above, is to provide pressure sensors with an attached controller, wherein observation of an abnormal pressure in any one of the rigid housings causes the controller to take corrective action thereby precluding damage to the fuel cell stack.

Yet a further aspect of the present invention, as set forth above, is to provide a sensor associated with each flexible bladder, wherein an observation of an abnormal material level is communicated to the controller for corrective action.

The foregoing and other aspects of the invention, which shall become apparent as the detailed description proceeds, are achieved by a pressure equalized fuel cell stack, comprising a fuel cell stack receiving an oxidizing agent; a coolant accumulator coupled to the fuel cell stack; an electrolyte accumulator coupled to the fuel cell stack; and means for equalizing the pressurized flow of coolant and electrolyte from their respective accumulators into the fuel cell stack depending upon the pressurized flow of the oxidizing agent.

The present invention also provides a fuel cell stack comprising at least one fuel cell; means for supplying an oxidizing agent, a coolant and an electrolyte to at least one fuel cell; a coolant accumulator disposed between the supply of coolant and at least one fuel cell; and an electrolyte accumulator disposed between the supply of electrolyte and at least one fuel cell; wherein the supply of oxidizing agent is coupled to the coolant accumulator and the electrolyte accumulator, and wherein a pressure head exerted by the supply of oxidizing agent causes pressure heads of the supply of coolant and the supply of electrolyte to track therewith.

BRIEF DESCRIPTION OF THE DRAWINGS

For a complete understanding of the objects, techniques, and structure of the invention, reference should be made to the following detailed description and accompanying drawings wherein.

BEST MODE FOR CARRYING OUT THE INVENTION

Figure 1:
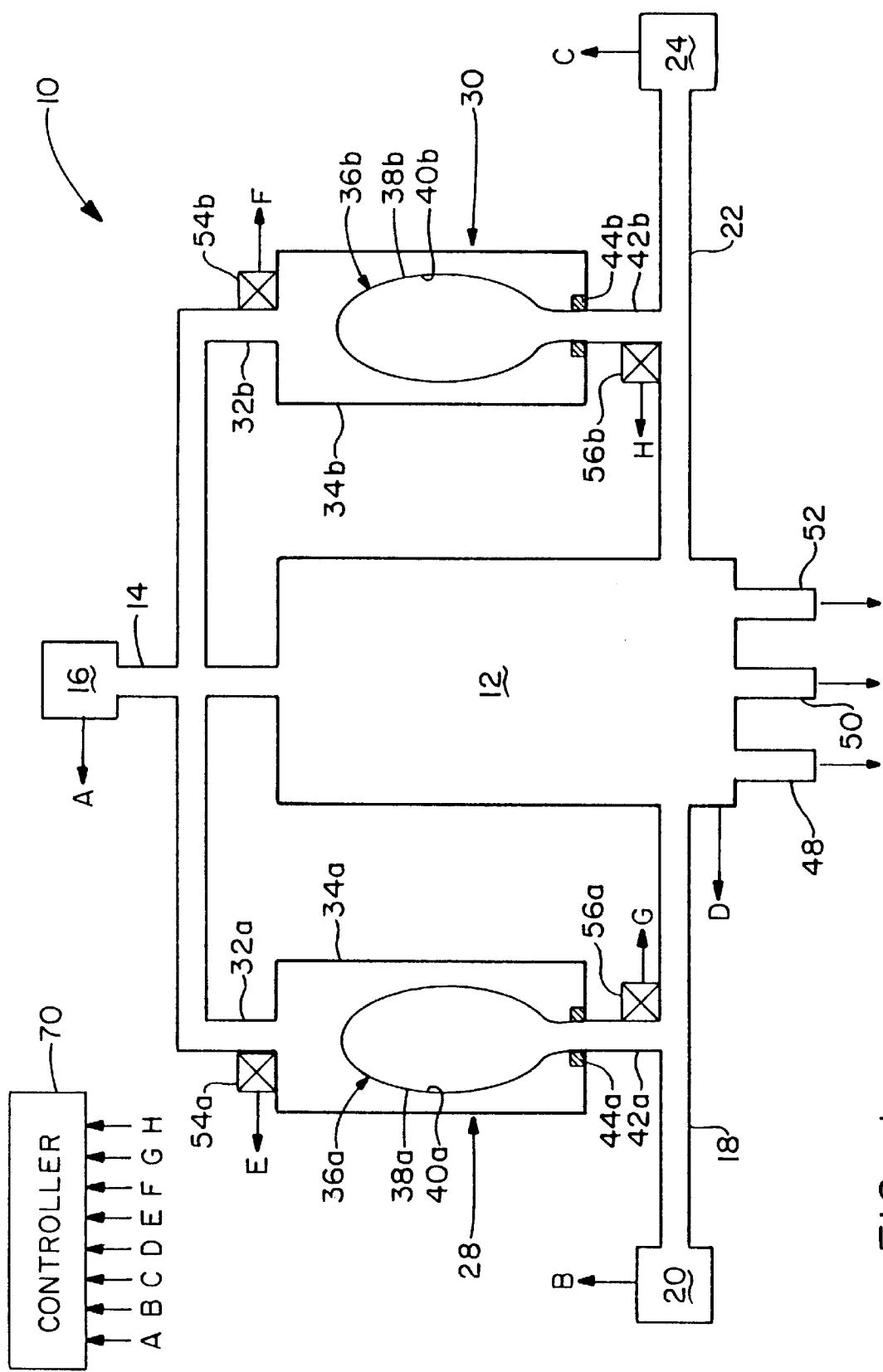
FIG. 1 is a schematic view of a pressure equalized fuel cell stack.

Referring now to the drawings and more particularly to FIG. 1, it can be seen that a pressure equalized fuel cell stack according to the present invention is designated generally by the numeral 10. The fuel cell stack 10 includes at least one fuel cell 12 which may be connected in series or in parallel with other fuel cells to provide the desired electrical output required to power a device. Although the present invention is configured for use with unmanned underwater vehicles, it will be appreciated by those skilled in the art that the concepts of the present invention may be employed with other fuel cells where a simplified pressure equalization scheme is required, such as in fuel cells with moving anodes.

The fuel cell 12 includes an oxidizing gas inlet 14 which is connected to a supply of oxidizing gas or agent 16. In a similar manner, the fuel cell 12 includes a coolant inlet 18 which is connected to a supply of coolant 20. Finally, an electrolyte inlet 22 is connected to a supply of electrolyte 24 and to the fuel cell 12.

Disposed between the oxidizing gas inlet 14 and the coolant inlet 18 is a coolant accumulator 28. In a similar manner, an electrolyte accumulator 30 is provided between the oxidizing gas inlet 14 and the electrolyte inlet 22. Those skilled in the art will appreciate that the coolant accumulator 28 and the electrolyte accumulator 30 are substantially the same structure only connected to different supplies of material provided to the fuel cell 12. Each accumulator 28 and 30 may be connected to a single fuel cell within a stack or to all of the fuel cells within a single stack. The following description of the coolant accumulator 28 and the electrolyte accumulator 30 is provided with alphabetic suffixes, wherein an "a" suffix designates a component associated with the coolant accumulator 28 and a "b" suffix indicates a component associated with the electrolyte accumulator 30. Those skilled in the art will appreciate that this substantially similar structure assists in providing pressure equalized supplies of the coolant and the electrolyte to the fuel cell 12. Moreover, it will be appreciated that where additional supplies of material must be delivered with equalized pressure to the fuel cell 10 or the like, the accumulator associated with the additional supply of material is likely to have a structure similar to that of the accumulators 28 and 30.

Each accumulator 28 and 30 provides an accumulator inlet 32a,b that is connected to the oxidizing gas inlet 14. Each inlet 32a,b is connected to a rigid housing 34a,b which receives the supply of oxidizing gas 16. Received within each rigid housing 34a,b is a flexible bladder 36a,b. Each flexible bladder 36 provides an exterior 38a,b opposite an interior 40a,b. The flexible bladder 36 is typically made of a rubber or like material which is impervious to the oxidizing gas, the coolant and the electrolyte supplied to the fuel cell 12. A seal 44a,b is provided between the exterior 38a,b and the respective rigid housing 34a,b. Each accumulator 28 and 30 is provided with an accumulator outlet 42a,b wherein outlet 42a is connected to the coolant inlet 18 and accumulator outlet 42b is connected to the electrolyte inlet 22. Accordingly, the supply of coolant 20 is received within the interior 40a through the coolant inlet 18 where it accumulates until needed by the fuel cell 12. Likewise, the electrolyte 24 is received through the inlet 22 and into the interior 40b of the flexible bladder 36b. The seals 44a,b function to prevent intermixing of the oxidizing gas or agent 16 and the respective coolant 20 or electrolyte 24.

The fuel cell 12 receives the oxidizing gas 16, the coolant 20 and the electrolyte 24 and with an anode and cathode causes a chemical reaction to generate electricity in a manner well known in the art. After the supplies of material have been used, they are respectively expelled from the fuel cell 12 by the oxidizing gas outlet 48, the coolant outlet 50 and the electrolyte outlet 52. These expelled materials may be dispensed from the underwater vehicle or recycled for further use.

Coupled to the oxidizing gas inlet 14 at its connection point with the respective accumulators 28 and 30 are pressure sensors 54a,b. In a similar manner, reflectance transducers 56a,b are associated between the accumulator outlets 42a,b and their respective inlets 18, 22. All of the sensors 54 and 56 along with the respective supplies of material 16, 20 and 24 and the fuel cell 12 are connected to and monitored by a controller 70 as indicated by the capital letter designations A-H. The controller 70, which in the preferred embodiment is a microprocessor, monitors the pressure of the oxidizing agent 14 entering the accumulators 28 and 30 and the presence of coolant 18 within the accumulator outlet 42a and the presence of electrolyte in the accumulator outlet 42b. If the controller 70 detects an abnormal pressure or level of material, the controller can adjust or cut-off all flow of material to the fuel cell 12 to prevent any damage thereto. The sensor 54 functions as a pressure ground for the closed loop volumetric system in the fuel cell stack 10. If any one of the sensors 56 defects an abnormal amount of material, such as the non-presence of material, the controller 70 causes material to be added to the appropriate accumulator. It will be appreciated that the controller 70 may also perform other control functions associated with the operation of the fuel cell stack 10 or with the underwater vehicle in general.

In operation, it can be seen that the pressure equalized fuel cell stack 10 receives an oxidizing gas 16 and an electrolyte 24 to generate a chemical reaction that generates electricity wherein the coolant 20 is provided to dissipate excess heat. In order to maintain an efficient reaction between the oxidizing gas 16, the cathode, the anode, and the electrolyte 24 and to maintain adequate flow of coolant 20, the oxidizing gas is transferred by an inlet 14 to the fuel cell 12, the coolant accumulator 28 and the electrolyte accumulator 30. The oxidizing gas 16 is received within each rigid housing 34 and exerts an equal pressure head on the flexible bladder 36 received within each rigid housing 34. Simultaneously, coolant 20 and electrolyte 24 are respectively received within the flexible bladders 36a and 36b and then into the fuel cell 12. Therefore, as the pressure head applied by the oxidizing gas 16 is increased, this additional pressure is exerted on the flexible bladders 36a,b which in turn cause a like pressure head to be applied to the supply of coolant 20 and the supply of electrolyte 24. In the event the pressure applied by the oxidizing gas 16 is decreased, a like decrease in the pressure head applied to the flexible bladders 36a,b cause a decrease in the pressure head of the coolant 20 and the electrolyte 24 as they are received in the fuel cell 12. If any one of the sensors 54a,b or 56a,b detect an abnormal pressure or level of material, respectively, the controller 70 initiates the necessary corrective action.

Figure 2:
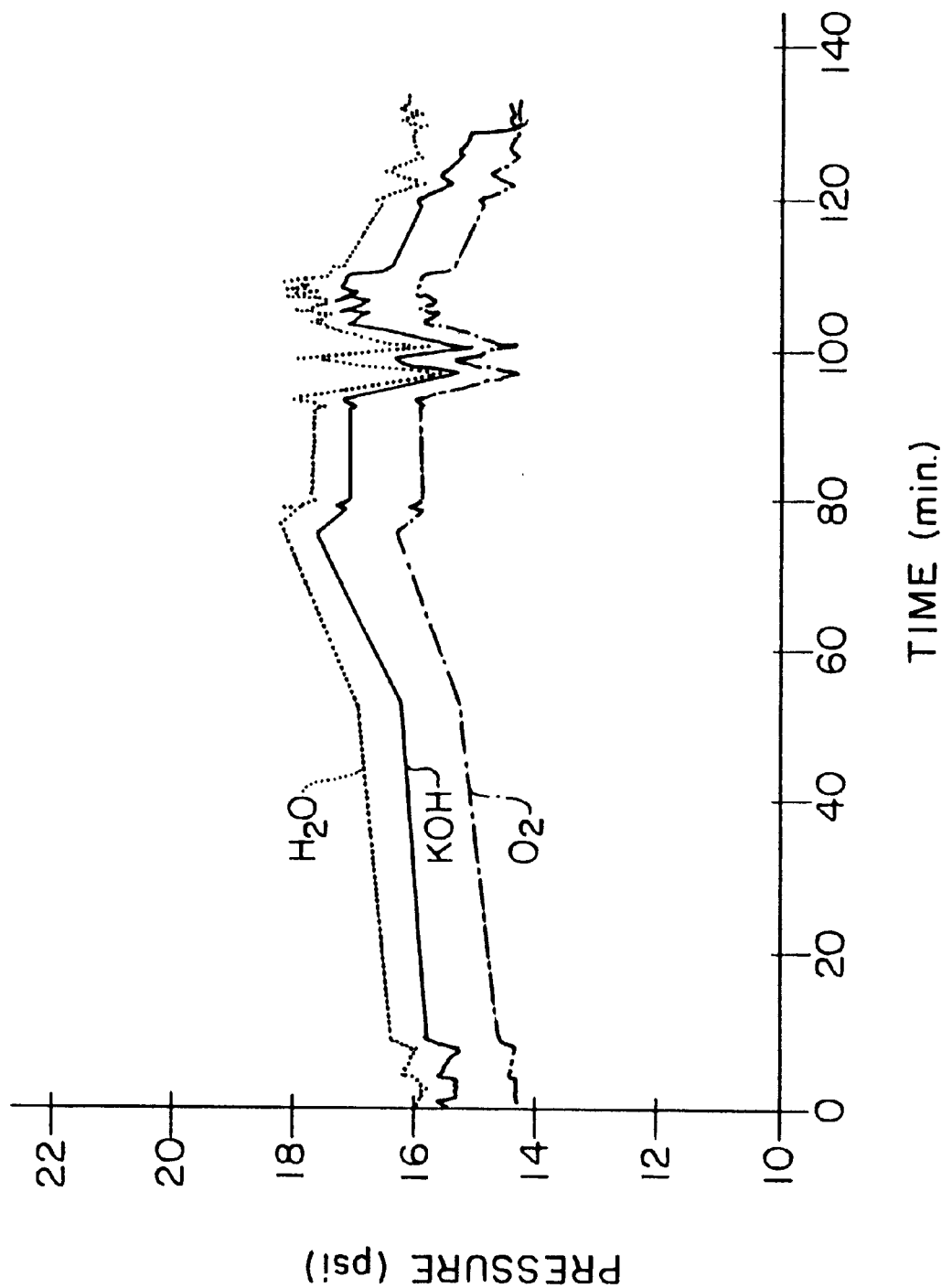
FIG. 2 is a graphical representation of the electrolyte and coolant pressures tracking the oxygen pressure.

As best seen in FIG. 2, the changes in pressure of the coolant, designated as $H_2O$ and the electrolyte, designated as KOH, tracks the pressure exerted by the oxidizing agent, designated as $O_2$. As evidenced by this graphical representation, the present invention provides numerous advantages over previously known fuel cell structures. In particular, the present invention maintains a consistently performing chemical reaction which ensures long life of the cathode and other components within the fuel cell 12. The present invention also ensures that the oxidizing agent, the electrolyte and the coolant are fully utilized, thus maximizing the run life of the underwater vehicle carrying the fuel cell stack 10. Still another advantage of the present invention is evident from the simplified structure in controlling the flow of the coolant and electrolyte into the fuel cell stack which reduces the cost of the fuel cell and of course, reduces the weight which maximizes the life of the unmanned underwater vehicle. Yet another advantage of the present invention is the pressure of the oxidizing gas, and the presence of electrolyte and coolant are continuously monitored by a controller so that any abnormal patterns within any of the inlets or otherwise, is immediately noted so that corrective action may be taken to preserve operation of the device or to allow for a backup system to be utilized.

Thus, it can be seen that the objects of the invention have been satisfied by the structure presented above. While in accordance with the patent statutes, only the best mode and preferred embodiments of the invention have been presented and described in detail, the invention is not limited thereto or thereby. Accordingly, for an appreciation of the true scope and breadth of the invention, reference should be made to the following claims.

What is claimed is:

1. A pressure equalized fuel cell stack, comprising:

a fuel cell stack receiving an oxidizing agent;

a coolant accumulator coupled to said fuel cell stack;

an electrolyte accumulator coupled to said fuel cell stack; and means for equalizing the pressurized flow of coolant and electrolyte from their respective accumulators into said fuel cell stack depending upon the pressurized flow of the oxidizing agent.

2. The pressure equalized fuel cell stack according to claim 1, wherein each said accumulator comprises:

a rigid housing for receiving the oxidizing agent; and a flexible housing received within said rigid housing for receiving respective coolant and electrolyte, said flexible housing coupled to said fuel cell stack wherein any change of pressure within said rigid housing causes a corresponding change in pressure in said flexible housing.

3. The pressure equalized fuel cell stack according to claim 2, further comprising a seal disposed between said rigid housing and said flexible housing.

4. The pressure equalized fuel cell stack according to claim 3, wherein the oxidizing agent exerts pressure upon an exterior surface of said flexible housings which in turn exerts a like pressure on the coolant and electrolyte received within said flexible housings.

5. The pressure equalized fuel cell stack according to claim 4, wherein the oxidizing agent is supplied to said fuel cell stack and said rigid housings by an oxidizing gas inlet, the coolant is supplied to a respective said flexible bladder by a coolant inlet and the electrolyte is supplied to a respective said flexible bladder by an electrolyte inlet.

6. The pressure equalized fuel cell according to claim 5 further comprising a pressure sensor coupled to each said rigid housing to provide a pressure ground.

7. The pressure equalized fuel cell stack according to claim 5, further comprising a plurality of sensors coupled to said flexible housings for detecting the presence of material.

8. A fuel cell stack comprising:

at least one fuel cell;

means for supplying an oxidizing agent, a coolant and an electrolyte to said at least one fuel cell;

a coolant accumulator disposed between said supply of coolant and said at least one fuel cell; and an electrolyte accumulator disposed between said supply of electrolyte and said at least one fuel cell;

wherein said supply of oxidizing agent is coupled to said coolant accumulator and said electrolyte accumulator, and wherein a pressure head exerted by said supply of oxidizing agent causes pressure heads of said supply of coolant and said supply of electrolyte to track therewith.

9. The fuel cell stack according to claim 8, wherein said coolant accumulator and said electrolyte accumulator each comprise:

a rigid housing having an inlet for receiving said supply of oxidizing agent and an outlet; and a flexible bladder received within said rigid housing and connected at said outlet for receiving respective supplies of said coolant and said electrolyte.

10. The fuel cell according to claim 9, further comprising:

first means for sensing the pressure of said oxidizing agent;

second means for detecting the presence of said coolant and said electrolyte; and means for controlling said supplies of said oxidizing agent, said coolant and said electrolyte when said first sensing means detects an abnormal pressure in either of said rigid housings or when said second sensing means detects the non-presence of material in either of said flexible bladders.

11. The fuel cell according to claim 10, further comprising a seal disposed between each said flexible bladder and respective said outlet.

12. The fuel cell stack according to claim 8, further comprising:

a transducer coupled to each said coolant and electrolyte accumulator for monitoring the pressure of oxidizing agent within each said accumulator; and a controller for monitoring each said transducer and taking corrective action whenever an abnormal pressure level is detected by either of said transducers.

* * * * *